(12) United States Patent
Giroire

(10) Patent No.: US 6,202,819 B1
(45) Date of Patent: *Mar. 20, 2001

(54) HYDRAULICALLY CONTROLLED CLUTCH RELEASE BEARING FOR A DIAPHRAGM CLUTCH, NOTABLY FOR A MOTOR VEHICLE, HAVING A GUIDE SLEEVE

(75) Inventor: Jean-Pierre Giroire, Saint-Germain-en-Laye (FR)

(73) Assignee: Valeo (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,231
(22) PCT Filed: Feb. 6, 1996
(86) PCT No.: PCT/FR96/00191
§ 371 Date: Dec. 20, 1996
§ 102(e) Date: Dec. 20, 1996
(87) PCT Pub. No.: WO96/24781
PCT Pub. Date: Aug. 15, 1996

(30) Foreign Application Priority Data

Feb. 9, 1995 (FR) .................................................. 95 01700

(51) Int. Cl.[7] .............................................. F16D 13/44
(52) U.S. Cl. .................... 192/91 A; 192/98; 192/85 CA
(58) Field of Search .................... 192/85 CA, 91 A, 192/98; 92/15, 107, 109, 165 R, 240, 249; 277/572, 576, 577

(56) References Cited

U.S. PATENT DOCUMENTS

| | | | |
|---|---|---|---|
| 2,926,938 | * 3/1960 | Ratti | 277/576 |
| 3,379,445 | * 4/1968 | Fisher | 277/577 |
| 3,822,772 | * 7/1974 | Murakami | 192/70.28 X |
| 4,515,258 | * 5/1985 | Johnson | 192/91 A |
| 4,541,516 | * 9/1985 | Fenzel | 192/85 CA |
| 4,601,374 | * 7/1986 | Ladin | 192/85 CA |
| 4,717,001 | * 1/1988 | Yoneda | 192/70.27 X |
| 4,778,039 | * 10/1988 | Eliasson | 192/85 CA |
| 4,781,024 | * 11/1988 | Nakamura | 277/572 X |
| 4,821,627 | * 4/1989 | Leigh-Monstevens | 192/91 A X |
| 4,938,332 | * 7/1990 | Thomas et al. | 192/85 CA |
| 4,960,193 | * 10/1990 | Hodge | 192/91 A |
| 4,993,529 | * 2/1991 | Leigh-Monstevens et al. | 192/91 A X |
| 5,074,395 | * 12/1991 | Maki et al. | 192/70.27 |
| 5,083,649 | 1/1992 | Baer | 192/98 |
| 5,193,433 | * 3/1993 | Reimer | 92/107 X |
| 5,211,099 | * 5/1993 | Grosspietsch et al. | 192/91 A X |
| 5,273,145 | * 12/1993 | Corral et al. | 192/91 A |
| 5,307,915 | * 5/1994 | Grosspietsch et al. | 192/85 CA X |

(List continued on next page.)

FOREIGN PATENT DOCUMENTS

| | | | |
|---|---|---|---|
| 3504086 | 8/1986 | (DE) . | |
| 4412734 | 3/1995 | (DE) . | |
| 2692950 | 6/1994 | (FR) . | |
| 2160283 | * 12/1985 | (GB) | 192/91 A |
| 2273541 | 6/1994 | (GB) . | |
| 88/09889 | 12/1988 | (WO) . | |

*Primary Examiner*—Charles A. Marmor
*Assistant Examiner*—Scott Lund
(74) *Attorney, Agent, or Firm*—Liniak, Berenato, Longacre & White, LLC

(57) ABSTRACT

A clutch release bearing having a fixed portion (5,6) including an inner support tube (6) and an outer body (5) concentric therewith which defines a control chamber (50) capable of being supplied with a fluid and housing an axially movable tubular piston (4) supporting a drive member (3) engageable with the diaphragm (13) of the clutch (1), wherein the support tube (6) axially projects beyond the outer body (5). The front end of the support tube (6) is surrounded by a guide sleeve (9) for the piston (4).

10 Claims, 3 Drawing Sheets

U.S. PATENT DOCUMENTS

| | | | |
|---|---|---|---|
| 5,458,224 | * | 10/1995 | Takano .............................. 192/85 CA |
| 5,480,017 | * | 1/1996 | Uenohara et al. ............. 192/91 A X |
| 5,620,076 | * | 4/1997 | Voit et al. ....................... 192/91 A X |
| 5,743,370 | * | 4/1998 | Thomire .......................... 192/85 CA |
| 5,855,375 | * | 1/1999 | Wilcox et al. ................... 277/572 X |
| 5,865,288 | * | 2/1999 | Thomire et al. ................ 192/91 A X |
| 5,887,692 | * | 3/1999 | Zelikov et al. ................. 192/91 A X |
| 5,908,097 | * | 6/1999 | Grosspietsch et al. ............ 192/91 A |
| 5,921,166 | * | 7/1999 | Machida et al. ............... 92/165 R X |
| 5,927,454 | * | 7/1999 | Campbell et al. .................. 192/98 X |

* cited by examiner

HYDRAULICALLY CONTROLLED CLUTCH RELEASE BEARING FOR A DIAPHRAGM CLUTCH, NOTABLY FOR A MOTOR VEHICLE, HAVING A GUIDE SLEEVE

BACKGROUND OF THE INVENTION

1. Field of the Invention

The present invention concerns hydraulically controlled clutch release bearings for a diaphragm clutch, notably for a motor vehicle, having a fixed portion comprising an inner support tube and an outer body concentric therewith, defining a blind annular cavity of axial orientation capable of being supplied with fluid and inside which is mounted an axially movable tubular piston.

2. Description of the Prior Art

Such a bearing is described for example in the document FR-A-2 692 950. In this document, the inner tube projects axially in relation to the outer body.

The piston carries at its front end a drive member capable of acting on the diaphragm of the clutch.

This bearing can be supplied by a fluid of the gaseous or liquid type and this is the reason why it is usually referred to as a hydraulically controlled clutch release bearing.

There is a problem with this type of bearing as impurities can enter the cavity defining with the piston a control chamber of variable volume.

The object of the present invention is to overcome this drawback in a simple and economical manner.

SUMMARY OF THE INVENTION

According to the invention, a bearing of the type indicated above is characterised in that the front end of the tube is surrounded by a guide sleeve for the piston.

Thus, by virtue of the invention, a baffle is created, preventing the entry of contaminants into the control chamber in a simple and economical manner.

Advantageously, this sleeve is made of a material with a low coefficient of friction and is attached with axial fixing to the tube, for example by crimping, snapping-in or adhesive bonding.

In one embodiment this sleeve has at least one catch capable of entering in a complementary manner into an indentation in the tube for its fixing to the said tube.

Advantageously, at least two catches and two indentations are provided.

This sleeve also makes it possible to limit the axial travel of the advantageously internally stepped piston so that the said piston has an internal shoulder capable of cooperating with the rear end of the guide sleeve.

Thus the piston remains inside the blind cavity notably before the bearing is associated with the clutch.

The fixed portion of the clutch release bearing can be in one piece but advantageously, in order to facilitate the installation of the piston inside the blind cavity and the insertion of the piston on the guide sleeve, the inner tube is separate from the outer body. This inner tube is metallic and has in one embodiment, at its rear end, an annular flange of transverse orientation allowing the outer body to be centred.

To this end, this flange has an annular rim of axial orientation for centring the guide tube in relation to a fixed portion, namely the casing of the gearbox in the case of an application for a motor vehicle.

By virtue of this embodiment, it is possible to have a thinner inner tube than in the case where the fixed portion is in one piece, with an inner tube obtained in an economical manner.

According to one characteristic the rear end of the piston carries a joint by means of a joining piece anchored in the said joint and mounted by snapping onto the rear end of the piston.

The joint enables the control chamber to be sealed and cannot come out of the blind cavity by virtue of the shoulder of piston cooperating in the aforementioned manner with the rear end of the guide sleeve.

The joint has lips and a pin capable of coming into abutment against the base of the cavity when the clutch is in the engaged position.

Noise is thus reduced, and the outer body serves to guide the joint so that it does not need to be internally machined in a precise manner, the guiding of the piston being effected by the guide sleeve and by the inner tube cooperating with the rear end of the piston.

Advantageously, the piston has at its front end a nose and an annular flange of transverse orientation enabling the mounting of a ball bearing capable of coming into contact with the inner end of the fingers of the clutch diaphragm. The guide sleeve provides a good support for the said nose.

This nose of the piston, in one embodiment, has a groove for mounting an axially acting elastic washer making it possible to clamp a radial edge offered by the inner raceway of the bearing in contact with the flange of the piston.

A clutch release bearing of the self-centring type is thus obtained.

By virtue of all these arrangements it is easy to insert between the outer body and the flange of the piston a pre-loading spring permanently forcing the bearing into contact with the ends of the fingers of the diaphragm. By virtue of this pre-loading spring it is possible, before installing the clutch release bearing inside the clutch, to create a unitary assembly, the flange of the guide tube coming into contact with the outer body, whilst the piston comes into abutment against the rear end of the guide sleeve in the aforementioned manner.

By extending the inner raceway of the bearing radially outwards it is possible to install a protective bellows surrounding the pre-loading spring and the piston. Thus the control chamber is protected by the bellows and by the guide sleeve.

According to one characteristic for reducing the axial dimension, the pre-loading spring, the piston and a tubular portion of the body are housed below the inner raceway of the bearing.

The description which follows illustrates the invention with reference to the accompanying drawings, in which:

DETAILED DESCRIPTION OF THE PREFERRED EMBODIMENT

Figure 1A:
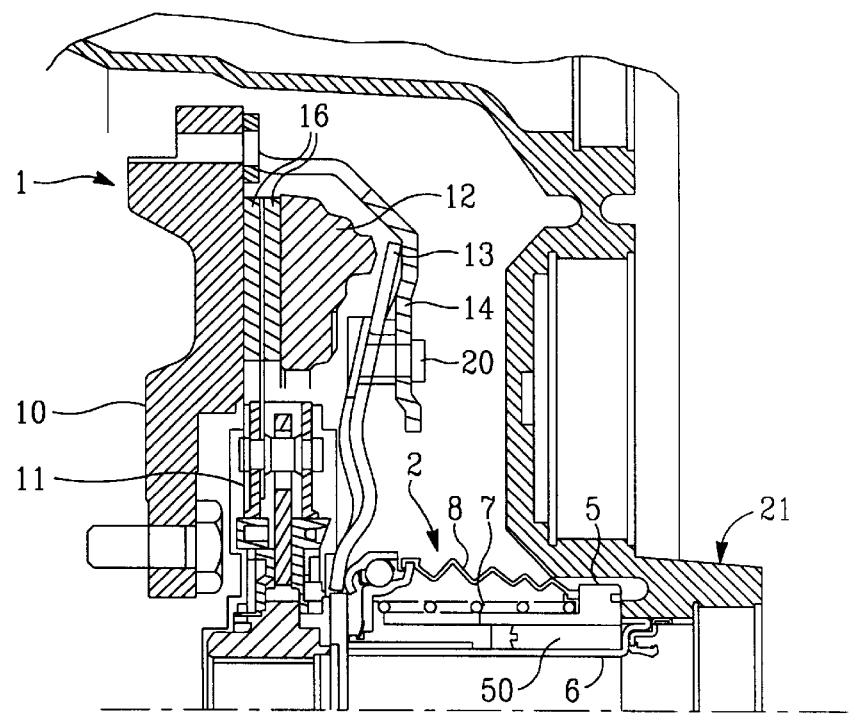
FIGS. 1A and 1B are views in axial section of a clutch for a motor vehicle fitted with the clutch release bearing according to the invention.
Figure 1B:
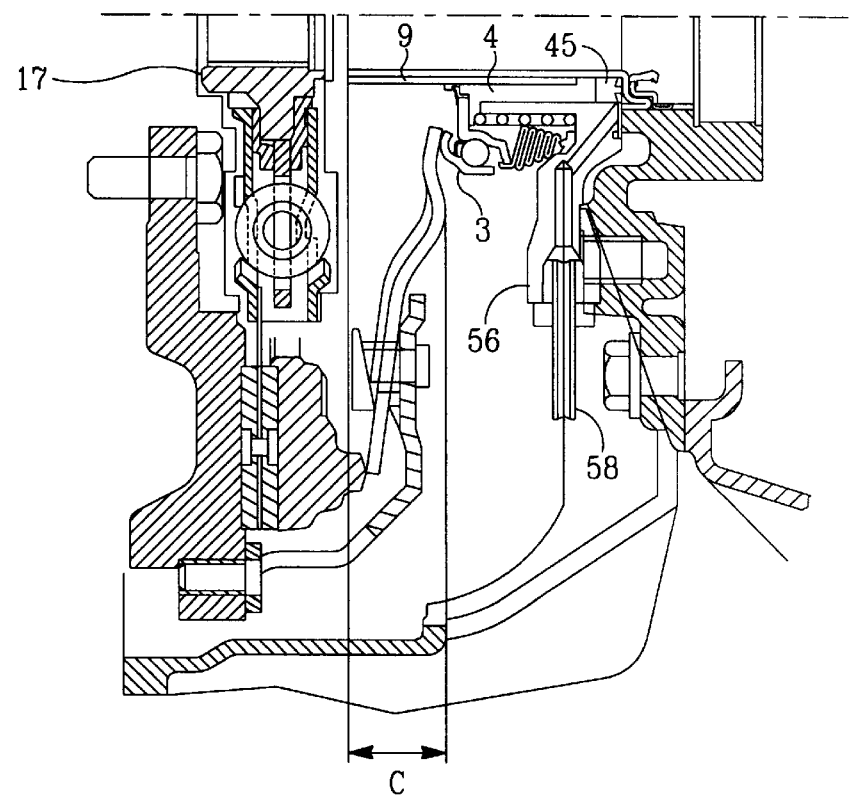
Figure 2:
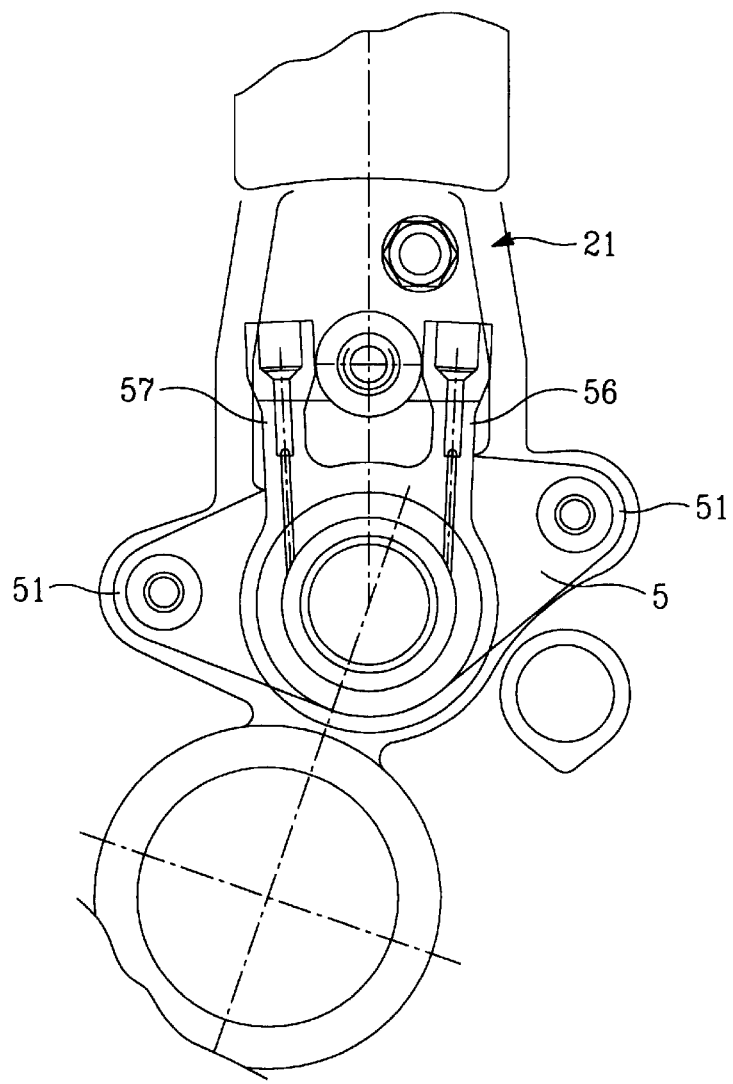
FIG. 2 is a side view of the outer body of the clutch release bearing of FIG. 1.

In FIGS. 1A, 1B a clutch can be seen at 1, having, in succession axially, a reaction plate 10, a friction disc 11, a thrust plate 12, a diaphragm 13 and a cover 14 in the form of a hollow dish.

The reaction plate 10 is designed to be fixed, here by screws, to a driving shaft, not visible, here the crankshaft of the engine of the motor vehicle, and offers up a friction face to the friction linings 16 which the friction disc 11 has at its outer periphery.

Figure 3A:
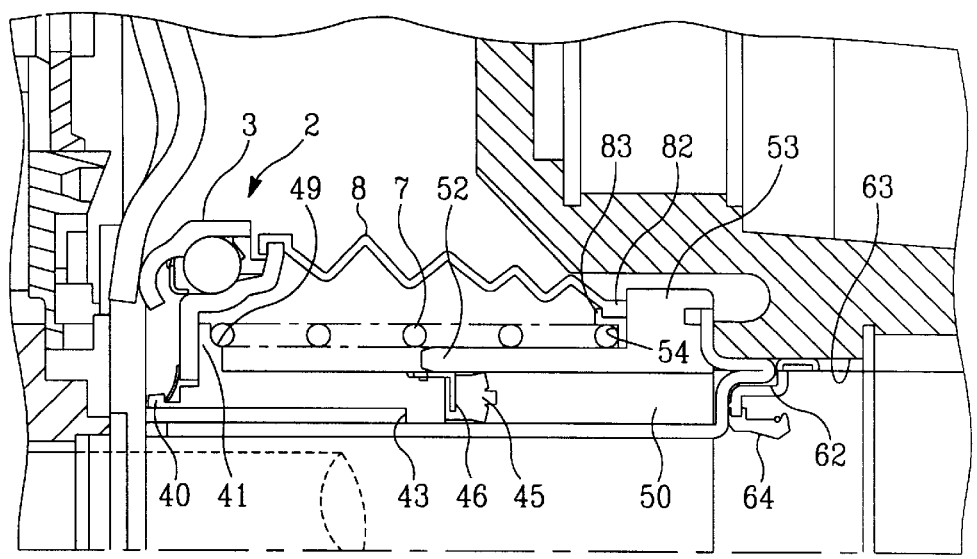
FIGS. 3A and 3B are partial views to a larger scale of the central part of FIG. 1.
Figure 3B:
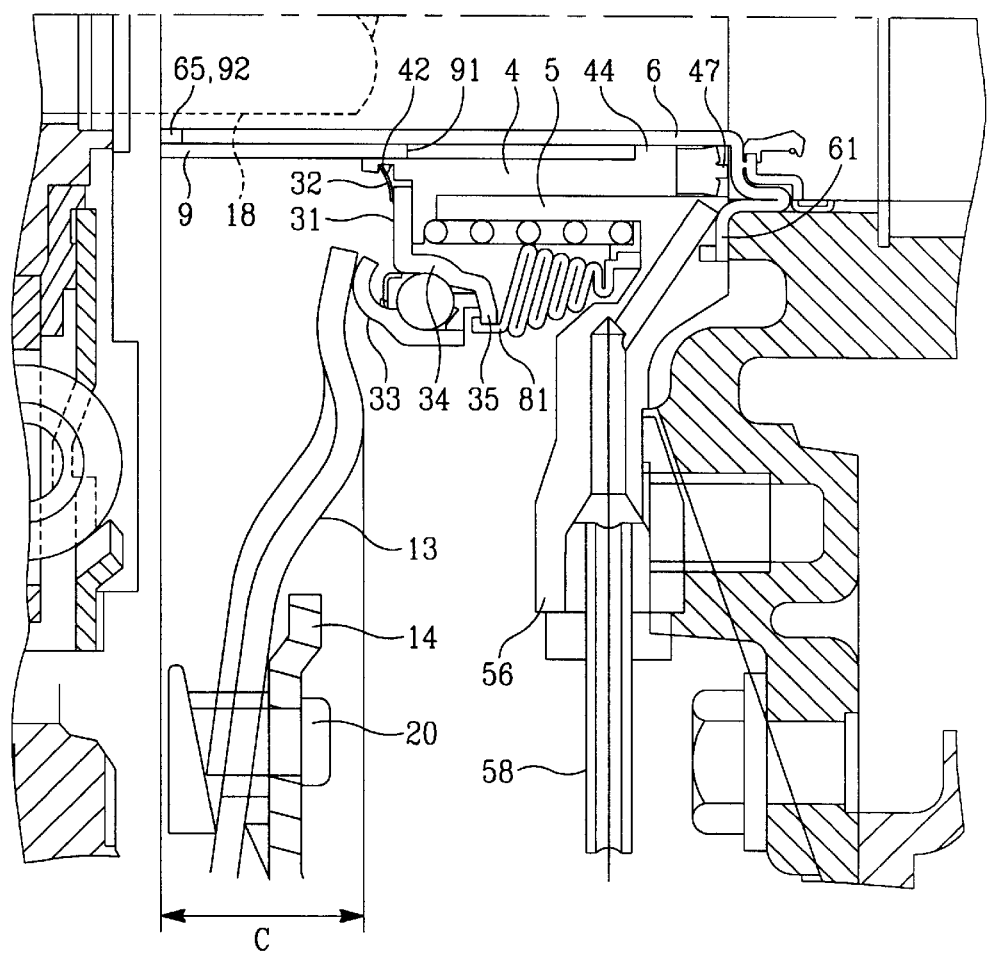

This friction disc 11 has at its inner periphery a ribbed hub 17 by means of which it is fixed in rotation on the input shaft 18 of the gearbox 21, the said shaft 18 being depicted partially in dotted lines in FIGS. 3A and 3B.

The thrust plate 12 offers up a friction face to the friction disc 11 and is connected in rotation to the cover 14, being mounted so as to be able to move axially in relation to the latter, in a manner known per se, by means of tangential tongues (not visible).

The hollow cover 14 here surrounds the linings 16, the thrust plate 12 and the diaphragm 13. It is fixed, by its radial edge, at its outer periphery, to the reaction plate 10, here by screws, not depicted.

The diaphragm 13 has, in a manner known per se, an outer peripheral part in the form of a Belleville washer and a central part divided into radial fingers by slits opening out internally in the central aperture of the diaphragm and externally in broadened orifices located at the inner periphery of the Belleville washer of the diaphragm.

These orifices are passed through by small columns 20 fixed to the base of the centrally perforated cover 14. The small columns 20 offer a secondary support to the inner periphery of the Belleville washer of the diaphragm 13, opposite a primary support formed by stamping in the base of the cover 14.

At the outer periphery of its Belleville washer, the diaphragm 13, of tapered shape in the free state, rests on a fragmented annular protrusion (not referenced) on the thrust plate 12.

Thus, by virtue of the small columns 20 the diaphragm 13 is mounted pivotally on the cover 14 between its primary and secondary supports and the clutch is normally engaged, the diaphragm 13 resting on the primary support of the cover 14 in order to force the thrust plate 12 in the direction of the reaction plate 10 so as to clamp the friction linings 16 of the disc 11 between the thrust plate 12 and reaction plate 10.

The torque is thus transmitted from the crankshaft to the input shaft of the gearbox 21 via the linings 16 here coupled elastically to the hub 17.

In order to disengage the clutch, in a manner known per se, it is necessary to act here by pushing by means of the clutch release bearing 2 on the inner end of the fingers of the diaphragm 13 in order to make the latter pivot and to cancel the load exerted by the diaphragm 13 on the thrust plate 12, the elastic tongues then returning the thrust plate 12 in the direction of the base of the cover 14 so as to release the friction linings 16 of the disc 11.

Here, the clutch release bearing 2 has a drive member 3 capable of acting on the inner end of the fingers of the diaphragm 13, a movable part, namely an axially movable piston 4, acting on the drive member 3 in order to manouver the latter, a fixed portion 5, 6, here in two pieces 5, 6, defining with the piston 4 a control chamber 50, elastic pre-loading means 7 interposed between the fixed portion 5, 6 and the piston 4 in order to permanently force the drive member 3 into contact with the fingers of the diaphragm 13 so as to exert a small initial load on the diaphragm 13, a protective bellows 8 and a guide sleeve 9 in order to guide the piston 4 during its axial movement.

The control chamber 50 is sealed, in a manner described hereinafter, for the introduction into the latter of a control fluid, such as air or oil, allowing the chamber to be pressurised or depressurised so as to axially move the piston 4 and the drive member 3. The chamber 50 is thus of variable volume, its volume varying in accordance with the axial movement of the piston 4.

For reasons of simplicity, the clutch release bearing 2 will be referred to as a hydraulically controlled clutch release bearing 2, the control fluid being of a gaseous or liquid nature.

Here, the drive member 3 consists of a ball bearing provided with an outer rotating raceway 33 profiled in order to come locally into contact with the inner end of the fingers of the diaphragm 13. In the example embodiment, the fingers are flat so that the outer raceway of the ball bearing 3 has, in cross-section, a curved profile.

Naturally, the converse is possible, the fingers of the diaphragm 13 having a curved inner end, whilst the outer raceway 33 of the ball bearing 3 then has a flat shape. All this depends on the application, given that a contact at a point is required.

The fixed inner raceway 34 of the ball bearing 3, here made of sheet metal, has a transverse annular edge 31, referred to as the inner edge of the ball bearing 3, directed radially towards the axis of the clutch release bearing 2 in order to couple it to the piston 4.

The piston 4 is of tubular shape and has transversely to its front end a transverse annular flange 41 directed radially in the opposite direction to the axis of the unit. The piston 4 is made from a mouldable material, such as an aluminium-based material, or plastic.

Here, the piston 4 is made from a plastic material having a low coefficient of friction in order to facilitate its movement.

It is on the front face of the flange 41, adjacent to the bearing 3, that the edge 31 of the bearing 3 rests. The edge 31 is subjected to the action of an axially acting elastic washer 32, a so-called self-centring washer, which bears at its outer periphery on the said edge. Here, the self-centring washer 32 is a washer of tapered shape whose inner periphery is divided into inclined lugs which bear against the side, furthest away from the flange 41, of a groove 42 made in the piston 4, between the free end of the latter and the flange 41.

The washer 32 thus has a dihedral cross-section and enables the edge 31 to be clamped in contact with the flange 41. Here, the height of the edge 31 is greater than the diameter of the balls of the bearing 3.

Thus the drive member 3 is coupled axially to the piston whilst having the possibility of moving radially in relation to the latter.

A self-centring clutch release bearing 2 is thus created in a manner known per se, enabling the ball bearing 3 to travel radially in order to centre itself in relation to the diaphragm 13, the clamping force exerted by the washer 32 depending on application, this force being calibrated so that the bearing does not fall under the effect of its own weight.

The control chamber 50 is delimited by two parts 5, 6 fixed in relation to the piston cylinder with the axially movable piston 4, namely an inner tube 6 and an outer body 5 concentric therewith.

The parts 5, 6 thus belong to the aforementioned fixed portion 5, 6 and delimit a blind cavity of axial orientation, inside which the piston 4 is mounted so as to be able to slide, projecting axially in relation to the said cavity, entering to a greater or lesser extent into the latter. This cavity is of annular form and is supplied with fluid.

One of the parts 5, 6 thus consists of an inner guide and support tube 6 surrounding the input shaft 18 of the gearbox 21. This tube 6, in this case metallic, has at its rear end an annular flange 61 of transverse orientation by means of which it bears on the gearbox 21, being thus contiguous with the latter. This tube 6 has an annular centring rim 62 produced in its flange 61 by folding. This rim 62, of axial orientation, enters the aperture 63 produced in the gearbox 21 for the passage of its input shaft. The rim 62 is in close contact with the internal bore of the aperture 63 such that it is centred by the said bore and the casing of the gearbox 21. A sealing joint 64 acts at the inner periphery of the rim 62 in order, in a manner known per se, to prevent oil leaking from the gearbox, the said joint 64 being interposed radially between the rim 62 and the input shaft of the gearbox 21.

The outer periphery of the flange 61 (the outer edge thereof) serves to centre a body 5 constituting the other part of the fixed portion 5, 6. The body 5 has laterally two perforated brackets 51, roughly diametrically opposed. It is by means of these brackets 51 that the body 5 is fixed, here by means of screws, to the casing of the gearbox 21. The rear end of the body 5 is indented, while having a right-angled cross-section, for the centring of the body 5 on the outer periphery of the flange 61, in this case metallic, and for the clamping of the flange 61 between the body 5 and the casing of the gearbox 21.

The support tube 6 extends in axial projection in relation to the body 5. This body 5, in this case in a mouldable material, surrounds the tube 6, in this case of small thickness. It is thus of tubular form and extends axially in axial projection in relation to the casing of the gearbox 21, just like the tube 6. Thus the chamber 50 is of annular, cylindrical form and of axial orientation, being delimited at its outer periphery by the tubular body 5, at its inner periphery by the tube 6, at one of its axial ends by the flange 61, forming the base of the chamber 50, and at its other axial end by the movable piston 4. Thus the tube 6 closes the chamber 50, the body 5 in this case being aluminium-based. Naturally, an O-ring seal, not referenced, intervenes between the flange 61 and the rear indented face of the body 5 to seal the chamber 50.

In operation, contaminants in the form of impurities, dirt or the like can be deposited on the tube 6.

In order to prevent these contaminants from entering the chamber 50, that is to say the blind cavity defined by the support tube 6 and the outer body 5, it is proposed, according to the invention, that a baffle be created.

Thus, in accordance with the invention, the front end of the tube 6 (its free end) is surrounded by the aforementioned guide sleeve 9.

This sleeve 9 thus surrounds the front end of the tube 6, being in close contact by means of its inner bore with the outer periphery of the tube 6, which thus serves as a centring device.

This sleeve 9 is made of material with a low coefficient of friction, in this case a plastic material with a low coefficient of friction.

It is attached with axial fixing to the tube 6 and offers by means of its outer periphery a guide area for the piston 4, more precisely for the internal bore thereof.

The rear end 44 of the piston 4 has an internal bore of smaller diameter so that the piston 4 is internally stepped with a transverse shoulder 43 being formed internally at the level where the diameter of the piston 4 changes.

As will have been understood and as is clear from the description and the drawings, the length of the sleeve 9 depends on the application, the axial rear end 91 of the sleeve 9 serving as a stop for limiting the axial movement (or travel) of the piston 4 in extreme cases and for preventing the diaphragm 13 from coming into contact with the friction disc 11.

This movement is limited by the cooperation of the shoulder 43 of the piston 4 with the said rear end 91 according to one characteristic of the invention.

Under normal conditions the piston 4 does not come into contact with the rear end 91.

The sleeve 9 constitutes a barrier blocking the access of contaminants to the tube 6, to the rear end 44 of the piston 4 and to the chamber 50.

Here, the sleeve 9 has at its front end fixing catches 92 capable of engaging in complementary apertures 65 produced at the front end of the tube 6, which serves as a support for the body 5 and the sleeve 9.

Beyond the sleeve 9, the tube 6 serves as a guide for the rear end 44 of the piston and for a seal 45 carried by the said rear end 44.

This seal 45 has two lips for cooperation respectively with the inner bore of the body 5 and the outer periphery of the tube 6. It has centrally in axial projection a stud 47 capable of coming into abutment against the flange 61 in order to reduce noise.

The seal 45 is attached to the rear end 44 of the piston 4 by means of a joining piece 46 of annular form. This piece 46 is metallic and has a right-angled cross-section with a transverse part anchored (or embedded) in the seal 45 and an axial part engaged on the outer periphery of the piston 4 and provided with inclined lugs obtained by cutting and folding. These lugs engage in a groove produced in the outer periphery of the rear end of the piston 4.

As will have been understood, the seal 45 equipped with its piece 46 is installed by being snapped into place, the lugs of the piece 46 spreading in order to then come into engagement with the side of the groove in the piston 4 nearest the rear face of the piston 4. Naturally, the piston 4 has externally a change in diameter at its rear end 44 so that the axial part of the piece 46 does not project in relation to the outer periphery of the piston 4.

The seal 45 cannot come out of the aforementioned blind cavity by virtue of the rear end 91 of the sleeve serving as a stop in the aforementioned manner.

The body 5 is stepped in diameter and has a tubular front portion 52 projecting axially in relation to a thicker rear portion 53 carrying the brackets 51. A transverse shoulder 54 is thus formed externally in the area where the diameter of the body 5 changes. The outer periphery of the portion 52 serves as a centring device for the aforementioned elastic pre-loading means 7. These means 7 consist in this case of a coil spring bearing on the shoulder 54 and on a transverse shoulder formed at the outer periphery of the flange 41 on the piston 4 on the rear face of the said flange. This shoulder belongs to an annular hollow 49 produced at the outer periphery of the flange 41. This hollow 49 reveals an area of axial orientation enabling the last turn of the axially oriented spring 7 to be centred. The inner raceway 34 of the bearing 3 extends radially above the flange 41 and is extended at its outer periphery by an edge 35, referred to as the outer edge of the bearing 3, directed radially in the opposite direction to the axis of the unit. The edge 35 is likewise offset axially in the opposite direction to the balls of the bearing 3, in this case sealed in a manner known per se, by virtue of its housing and a joint not referenced in FIG. 1.

By virtue of this arrangement it is possible to mount the front end 81 of the bellows 8, in this case of tapered form, on the outer edge 35 by nesting, the front end 81 having an annular groove for receiving the edge 35. At its rear end of smaller diameter the bellows 8 has a rim 82 capable of being sandwiched between the shoulder 54 and an edge of a sinuous part 83. It is by means of this part 83, in this case metallic, that the spring 7 bears on the shoulder 54. In other words, the spring 7 enables the part 83 to be clamped in contact with the shoulder 54, the said part 83 enabling, radially beyond the spring 5, the rim 82 for securing the bellows 8 to be clamped in contact with the shoulder 54.

It will be appreciated that the bellows 8, concertina-shaped, surrounds and protects the spring 7, the piston 4 and the chamber 50, preventing the ingress of contaminants, dirt, impurities or the like. Thus, in accordance with one characteristic, the bellows 8 surrounds the spring 7, which surrounds the tubular portion 52, the piston 4 and the chamber 50.

Thus the chamber 50 is well protected both by the bellows 8 and by the guide sleeve 9.

The pre-loading spring 7, the piston 4 with its flange 41, the sleeve 9, the tube 6 and the tubular portion 52 are located radially below the main part of the non-rotating inner raceway 34 of the bearing 3, the said raceway 34 being of roughly axial orientation, being equipped at its inner periphery with the edge 31 and at its outer periphery with the edge 35. Thus the piston 4, the spring 7 and the portion 52 are housed below the main part of the raceway 34 in order to reduce the axial dimension.

This pre-loading spring 7 rests on the flange 41 around a circumference of diameter greater than the circumference on which the self-centring washer 32 bears, which is thus of reduced size.

Thus the piston 4 has at its front end a tubular nose 40 projecting axially in relation to its flange 41 and making it possible, by virtue of the groove 42, to fit the self-centring washer 32 and to limit the movement of the edge 31 and the bearing 3; a predetermined radial clearance existing between the inner bore of the edge 31 and the outer periphery of the nose 40.

The springs 32 and 7 exert axial forces in opposing directions on the flange 41, which is conducive to the smooth sliding of the piston.

The main part of the inner raceway 34 of the bearing 3 is directed axially towards the body 5 and also surrounds the flange 41 so as to be conducive to a reduction in the axial dimension of the bearing 2.

By virtue of the edge 31 it is possible to reduce the height of the flange 41 and to form the nose 40.

The supply to the chamber 50 is effected through the rear, the thicker rear portion 53 of the body 5 carrying two transversely projecting nozzles 56, 57 respectively for supplying and draining the chamber 50.

These nozzles 56, 57 extend transversely in parallel to the front face of the casing of the gearbox 21.

The nozzles 56, 57 are disposed on both sides of a fixing hole (FIG. 1) produced in the casing of the gearbox 21.

The supply and drainage channels, provided in the nozzles 56, 57, have a transverse portion extended by an inclined portion opening out at the flange 61 of the tube 6, that is to say in the base of the chamber 50.

This arrangement allows the available space to be occupied optimally and the axial dimension of the bearing 2 to be reduced, each nozzle 56, 57 thus having a transversely oriented part extended by an inclined part for attachment to the thicker rear end 53 of the body 5. It will be noted that the fingers of the diaphragm 13 have a curved intermediate zone, which likewise allows the axial dimension to be reduced.

Thus in FIG. 1 there can be seen in the upper part of the bearing 2 in the extracted position when the clutch is disengaged and in the lower part the bearing 2 in the retracted position when the clutch is engaged.

In this retracted position the inner raceway 33 partly surrounds the portion 52 of the body 5, and the bellows 8, of tapered shape, is compressed without interfering with the nozzles 56, 57.

In FIGS. 1 and 3 the clutch release movement has been marked C.

As is known, the bearing according to the invention forms a receiver of the concentric type controlled by a master cylinder (not visible) operated by the clutch pedal. Here the control fluid is oil.

By maneuvering the clutch pedal the piston of the master cylinder is moved, which makes it possible, by means of a connecting pipe 58, depicted partially in FIG. 1, to pressurise the chamber 50 and to move the piston 4 along the sleeve 9, the joint 45 moving along the tube 6 and the inner periphery of the body 5. It is the diaphragm 13 which brings the bearing 2 back when the chamber 50 is depressurised in order to engage the clutch.

By virtue of the sleeve 9 it is possible to pre-assemble the bearing 2.

This is because the body 5 is placed on the support 6 or vice versa, then the part 83 is fitted and the rim 82 of the bellows 8 put in place, then the spring 7 is fitted, then the piston 4 is mounted, compressing the spring 7, and afterwards the sleeve 9 is inserted between the piston 4 and the tube 6.

Thus a sub-assembly is obtained by virtue of the spring 7 holding the body 5 against the flange 61 and the piston 4 against the rear end 91 of the sleeve 9. Finally, the bearing 3 and the washer 32 are mounted.

Naturally, the flange 61 can have lugs (or tenons) entering into complementary mortices in the body 5, being locked by crimping.

Figure 4:
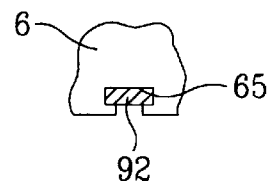
FIG. 4 is a partial view of the joining means between the inner tube and the guide sleeve.

Here, the front end of the sleeve 9 has at least one catch 92 and the front end of the tube 6 a complementary open indentation 65. The catch 92, forming a tenon, is engaged in the indentation 65 forming a mortice, contact being made between the catch and the base of the indentation 65, then locking is effected by producing laterally a crimp causing the material of the lateral edges of the indentation 65 (FIG. 4) whose edges have a U-shaped cross-section to yield. The sleeve 9 is thus fixed axially and with respect to rotation by crimping and connection of shapes with the tube 2.

Figure 5:
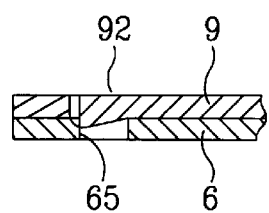
FIG. 5 is a partial view in axial section showing the joining means between the inner tube and the guide sleeve for another example embodiment.

In a variant (FIG. 5) the indentation 65 can be closed and the catches 92 can belong to the elastically deformable longitudinal lugs cut from the sleeve. Mounting is effected by snapping in, causing the sleeve 9 to be fixed axially and with respect to rotation.

In a variant, the indentation is closed and the catch 92 moulded in one piece with the sleeve 9. Mounting is then effected by means of force-fitting.

In all cases a fixing of the sleeve 9 to the tube 6 is obtained. Preferably at least two catches 92 and two diametrically opposed indentations 65 are provided.

It will be appreciated that by virtue of the invention the body 5 does not need to be machined in a precise manner, the areas for guiding the piston 4 being formed by the outer periphery of the sleeve 9 and by the outer periphery of the tube 6, the joint 45 being guided by the tube 6 and the internal bore of the body 5.

More precisely (FIG. 3) the sleeve 9 extends in axial projection in relation to the body 5, a gap roughly equal to the width of the rear end 44 of the piston 4 existing between the sleeve 9 (the rear end 91 thereof) and the bevelled free end of the tubular portion 52 of the body 5 when the bearing is in the extraction position with the clutch disengaged. Here the aforementioned gap is slightly smaller than the width of the rear end 44 of the piston 4, which is thus guided very well.

Naturally, the present invention is not limited to the example embodiment described. In particular, the fixed portion 5, 6 of the bearing can be made in one piece.

In all cases the tubular piston 4 is mounted so as to be able to move (or slide) axially inside a blind annular cavity of axial orientation delimited by an inner support tube 6 and an outer body 5 concentric therewith, the said tube 6 projecting axially in relation to the body 5, being passed through by a driven shaft, in this case the input shaft 18 of the gearbox, whilst the cavity is capable of being supplied with a fluid such as oil or air.

This cavity defined with the piston 4 has a control chamber 50 of variable volume.

Naturally, the clutch release bearing is not necessarily self-centring, the bearing being able to be fitted on the piston. In a variant, the inner or outer raceway can be made in one piece with the piston as described in the said document FR-A-2 692 950.

The structure of the bearing can be reversed depending on the application. Thus the inner raceway of the bearing can be rotating and the outer raceway fixed, having the edges 31 and 35 described above.

It will be appreciated that the formation of the fixed portion in two pieces is preferable as the inner tube 6 can have a smaller thickness than when the fixed portion is made in one piece.

This tube is thus obtained in an economical manner. In addition, with a fixed portion in two parts, it is easy to produce the supply and drainage channels associated with the nozzles 56 and 57, for example, by drilling, given the fact that the said channels are located at the rear of the outer body 5 and are partially inclined.

Naturally, the fixed portion can be in three parts, namely an outer body 5, an inner tube 6 and a base.

In this case, the guide sleeve can be moulded onto the tube 6.

Mounting can be effected in reverse. The piston is then slipped on the tube 6 equipped with the sleeve 9, then the spring 7 is mounted and the body 5 and the bellows are fitted, and finally the base is mounted. The bearing 3 is mounted last. Naturally, in all these cases, the piston 4 can be equipped with the bearing from the outset.

It will be appreciated that by virtue of the sleeve 9, according to the invention, the protection of the joint 45 is assured and that the service life and reliability of the clutch release bearing 2 are increased.

It will be appreciated that the rear end of the body 5 is indented in order to clamp the flange 61 of the tube 6 between the body 5 and a fixed part, here the gearbox 21. In a variant, the flange 61 can have an annular centring rim, which extends axially from its outer peripheral edge. This rim cooperates with an aperture produced in the said gearbox. Below the rim, the flange then has an axial recess which serves as a centring device for the outer body. For further details, reference should be made to FIGS. 6 and 7 of the application FR 95 10750 of Sep. 14 1995.

I claim:

1. A hydraulically controlled clutch release bearing for a clutch (1) with a diaphragm spring (13), said clutch release bearing having a fixed portion (5, 6) comprising an inner support tube (6) and an outer body (5) concentric with the inner support tube (6), the inner support tube (6) and the outer body (5) defining a blind annular cavity (50) of axial orientation for receiving fluid and inside which is mounted, so as to be axially movable, a tubular piston (4) having a drive member (3) for acting on the diaphragm spring (13) of the clutch (1), wherein the inner support tube (6) projects axially, at a front end thereof, beyond the outer body (5), wherein the front end of the inner support tube (6) is surrounded by a guide sleeve (9) that offers a guide area for the piston (4), wherein said guide sleeve (9) constitutes a barrier blocking access of contaminants to the inner support tube (6) and the annular cavity (50), wherein a rear end (91) of the guide sleeve (9) forms a stop limiting axial travel of the piston (4) and the piston (4) is internally stepped so as to form a shoulder (43), on an inside portion thereof, for cooperating with the rear end (91) of the guide sleeve (9), and wherein said guide sleeve (9) contacts and is supported by the inner support tube (6).

2. The clutch release bearing according to claim 1, wherein the guide sleeve (9) is made of a plastic material.

3. The clutch release bearing according to claim 1, wherein the guide sleeve (9) is attached with axial fixing to the inner support tube (6).

4. The clutch release bearing according to claim 3, wherein the guide sleeve (9) has at least one catch (92) engaging, in a complementary manner, an indentation (65) in the inner support tube (6) for attachment to the inner support tube (6).

5. The clutch release bearing according to claim 1, wherein the piston (4) has, at a front end thereof, a transverse annular flange (41) directed radially in an opposite direction to an axis of the clutch release bearing, and wherein the drive member (3) consists of a ball bearing having a fixed inner raceway (34) provided with a transverse annular edge (31) directed towards the axis of the clutch release bearing (2) and bearing against the annular flange (41) of the piston (4).

6. The clutch release bearing according to claim 1, wherein the outer body (5) is stepped with a transverse shoulder (54) and has a tubular portion (52) serving to center a pre-loading spring (7) acting between the shoulder (54) of the outer body (5) and an annular flange (41) of the piston (4).

7. The clutch release bearing according to claim 1, wherein the rear end (44) of the piston (4) has a seal (45) joined thereto by means of a joining piece (46) anchored in the seal (45) and mounted, by snapping, onto the rear end (44) of the piston (4).

8. The clutch release bearing according to claim 7, wherein the seal (45) has two lips for cooperation respectively with an inner bore of the outer body (5) and an outer periphery of the inner support tube (6).

9. The clutch release bearing according to claim 7, wherein the seal (45) has centrally, in axial projection, a stud (47) for abutting a base of the annular cavity in order to reduce noise.

10. The clutch release bearing according to claim 7, wherein the joining piece (46) is metallic and has a right-angled cross-section with a transverse part anchored in the seal (45) and an axial part engaging an outer periphery of the piston (4) and is provided with inclined lugs obtained by cutting and folding, said lugs engaging a groove produced in the outer periphery of the rear end (44) of the piston (4).

* * * * *